United States Patent Office 3,390,032
Patented June 25, 1968

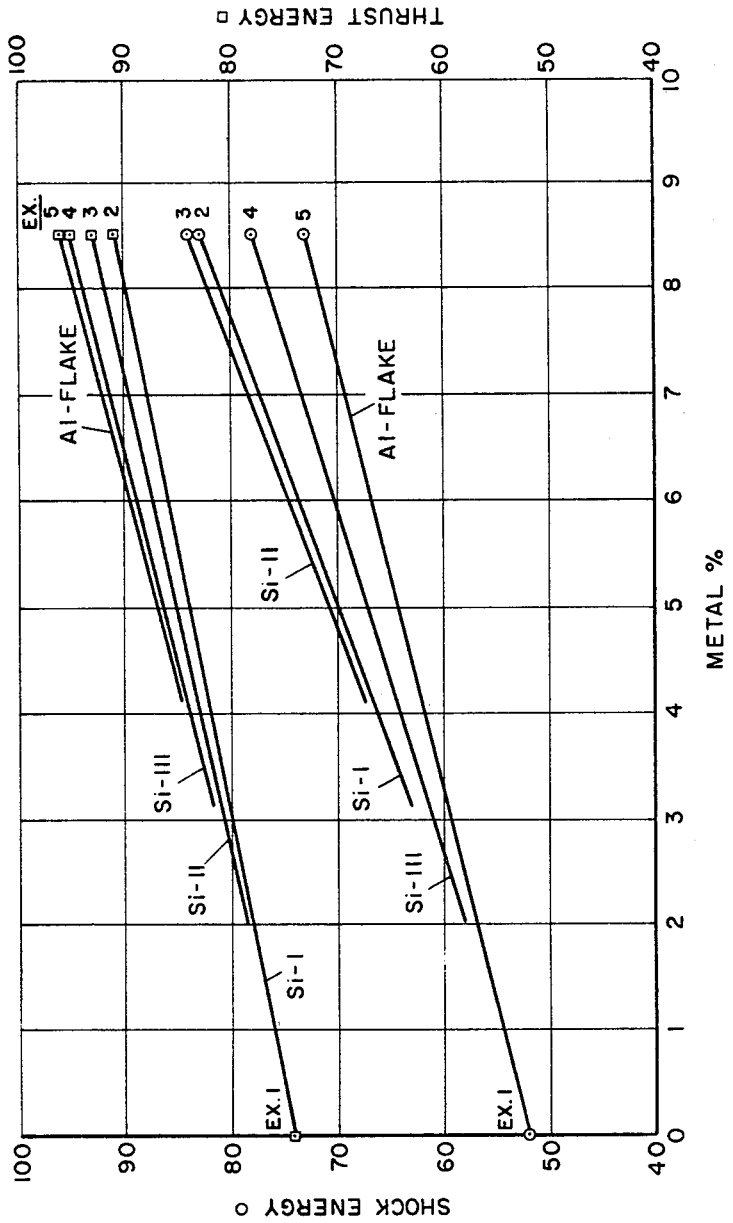

3,390,032
GELLED AQUEOUS SLURRY EXPLOSIVE COMPOSITION CONTAINING AS A GAS GENERATING AGENT A CARBONATE OR BICARBONATE WITH A NITRITE
Alfred A. Albert and Robert W. Lawrence, Wilmington, Del., assignors to Hercules Incorporated, Wilmington, Del., a corporation of Delaware
Filed Jan. 4, 1967, Ser. No. 607,261
5 Claims. (Cl. 149—45)

ABSTRACT OF THE DISCLOSURE

An explosive composition containing in combination fast and slow in situ gas generating materials for adjusting and improving the control of the specific gravity of a gelled aqueous slurry explosive composition. Sodium bicarbonate and sodium nitrite respectively, are such gas generating materials.

---

This invention relates to aeration agents and more particularly to an improved aeration agent for adjusting and improving the control of the specific gravity of a gelled aqueous slurry explosive composition at the time of blasting.

The advantages of incorporating aeration agents, for specific gravity or density control, into aqueous slurry explosives have been disclosed by Ferguson et al. (U.S. 3,288,658) and Swisstack (U.S. 3,288,661).

Now in accordance with the present invention an improved and unique combination of in situ gas generating chemicals has been discovered which provides a rapidly obtained, but yet, reliably stable and efficient specific gravity control. As disclosed in the aforementioned patents, the control of specific gravity or density provides a means for energy control of the explosive and in addition can be employed to impart increased sensitivity, shock energy and thrust energy as will be further demonstrated herein.

More specifically, the present invention is directed to an improved aeration agent for adjusting and improving the control of the specific gravity of a gelled aqueous slurry explosive composition at the time of blasting, wherein the improvement comprises a fast gas generating material of the group consisting of sodium bicarbonate, potassium bicarbonate, sodium carbonate and potassium carbonate, and mixtures thereof, and a slow gas generating material of the group consisting of sodium nitrite, potassium nitrite, calcium nitrite and barium nitrite, and mixtures thereof.

Examples of operation of the invention are given in parts by weight for aqueous slurry blasting agents without and with metal fuels wherein it will be noted that Example 1 contained no metal, Examples 2, 3 and 4 contained silicon and Example 5 contained aluminum. These examples are given in Table I and were prepared as follows:

(1) Make a solution by combining the AN, SN and water. Heat to dissolve.
(2) Adjust the pH to between 5.4 and 6.0 with ammonium hydroxide or acetic acid as is required.
(3) Blend the sodium bicarbonate, the sodium nitrite, the coal, the guar gums together in that order and then blend with the silicon or with the aluminum.
(4) With the solution at a temperature of 140° F. mix the dry ingredients into the solution.

TABLE I

| Example No | 1 | 2 | 3 | 4 | 5 |
|---|---|---|---|---|---|
| Components: | | | | | |
| Silicon Type I (63% on 100 mesh) | | 8.5 | | | |
| Silicon Type II (6% on 100 mesh) | | | 8.5 | | |
| Silicon Type III (all thru 200 mesh) | | | | 8.5 | |
| Aluminum Flakes | | | | | 8.5 |
| Water | 16.9 | 16.5 | 16.5 | 16.5 | 16.5 |
| Ammonium Nitrate, prills | 53.5 | 52.0 | 52.0 | 52.0 | 52.0 |
| Sodium Nitrate, prills | 16.1 | 15.6 | 15.6 | 15.6 | 15.6 |
| Ethylene Glycol | 11.1 | 5.0 | 5.0 | 5.0 | 5.0 |
| Ground Coal | 1.2 | 1.2 | 1.2 | 1.2 | 1.2 |
| Guar Gum [1] | 0.4 | 0.4 | 0.4 | 0.4 | 0.4 |
| Guar Gum [2] | 0.8 | 0.8 | 0.8 | 0.8 | 0.8 |
| Sodium Nitrite | 0.025 | 0.046 | 0.046 | 0.046 | 0.046 |
| Sodium Bicarbonate | 0.025 | 0.046 | 0.046 | 0.046 | 0.046 |
| Oxygen Balance, percent | −0.8 | −3.4 | −3.4 | −3.4 | −1.1 |
| Final, 24 Hour Specific Gravity [3] | 1.24 | 1.14 | 1.15 | 1.15 | 1.13 |
| pH | 5.0 | 4.8 | 5.2 | 4.7 | 5.0 |
| Detonation Rate, M/S | 5,550 | 4,650 | 5,250 | 5,000 | 4,750 |
| Pipe Diameter, inches | 5 | 5 | 5 | 5 | 5 |
| Booster | XC-49 | XC-49 | XC-49 | XC-49 | XC-49 |
| Slurry Temperature, ° F | 89 | 86 | 88 | 87 | 90 |
| Underwater Measured Energy Weight Basis, Relative to Confined 60% HP Gel: | | | | | |
| Shock Energy | 0.52 | 0.83 | 0.84 | 0.78 | 0.73 |
| Thrust Energy | 0.74 | 0.91 | 0.93 | 0.95 | 0.96 |

[1] Natural guar gum.
[2] Cross-linkable guar gum.
[3] Maximum specific gravities 1.4–1.5.

All of the examples shown in Table I were tested for explosive energy and detonation rate while confined underwater. Detonation rates were measured over a length of 20 cm., and were recorded on a counter chronograph. The underwater thrust (bubble) and shock energies were determined in the manner indicated by Cole (Cole, H. C., Underwater Explosions, Princeton University Press, Princeton, N.J. (1948), pages 228 to 285) and as reported by Sadwin (Sadwin, L. D., Cooley, C. M., Porter, S. J., Stresau, R. H.; Underwater Evaluation of the Performance of Explosives, International Symposium on Mining Research, Missouri, February 1961, vol. 1) and his collaborators with some minor modifications.

The data are reported relative to confined 60% HP gel. The charges, 20 lb. to 30 lb. in weight, are confined in 5-inch diameter by 28-inch long black iron pipe. The pipes were suspended vertically, 12 feet below the surface of the water to the charge center, and 28 feet from the bottom of the pond. The charges were initiated from the bottom with XC-49 pentolite boosters (50/50 PETN/TNT), 3-inch diameter by 1-inch high and 190 grams in weight. The pressures generated by the detonations were sensed by piezoelectric hydrophone transducers and were recorded on an oscilloscope. The bubble times were also sensed by the transducers and were recorded on the oscilloscope.

With reference to the examples, it will be noted that all compositions shot with a high detonation rate. An outstanding result, however, was that the silicon compositions and particularly Si III gave thrust energy results substantially equivalent to the aluminum and gave shock energy results superior to that of the aluminum. This is shown graphically in the attached drawing.

Another outstanding result was the ability of the aeration agent of this invention to develop a substantially constant specific gravity for the explosive compositions immediately and over a sustained period of time. This is important, since under field conditions a charge may be fired soon after placing in a bore hole or it may be fired a considerable time later amounting to days. This, it is believed, is attributable to the following. Addition of appropriate amounts of sodium bicarbonate and sodium nitrite to a slurry under reaction conditions produces gases believed to be carbon dioxide and nitrogen. The former is produced rapidly giving an immediate lowering in density, while the latter is produced slowly maintaining the desired low density as the carbon dioxide is absorbed by the slurry. The density reduction is efficient (based on sodium nitrite), is reproducible, and stable. This rapidly obtained density reduction is achieved without materially changing the composition of a slurry and can be varied easily and accurately.

This improved system of density control is applicable to all slurry gels providing reaction conditions are present. The rate of both reactions I. 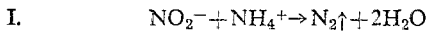  $NO_2^- + NH_4^+ \rightarrow N_2\uparrow + 2H_2O$ II. 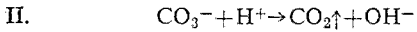 $CO_3^- + H^+ \rightarrow CO_2\uparrow + OH^-$ vary with pH and temperature. Acidity of the base slurry can be varied from the pH 3 to about pH 6, depending upon the rate of reaction desired with increased acidification accelerating the reaction and decreased temperature decelerating the reaction.

It will be appreciated that the ammonium cation in Equation I is ordinarily introduced by the presence of ammonium nitrate. When, however, it is desired to entirely replace the ammonium nitrate with another inorganic oxidizing salt or salts, such as, sodium nitrate or sodium perchlorate for example, it is necessary to incorporate a compound which is water soluble and contains nitrogen in the negative oxidation state. Suitable compounds are those having the general formula $R-NH_2$ where R is an acyl alkanol or alkane group. Preferred compounds include urea and sulfamic acid, wherein the former may be included as a portion of the carbonaceous fuel and the latter may be incorporated in an amount in the order of 1 to 1 molar ratio of acid to nitrite.

In Table II, Examples 6 and 7 show compositions in parts by weight in which it will be noted in the sub-summary that the combination of sodium nitrite and sodium bicarbonate gave the best overall results, that is, the slurry neither continued to drop in density nor rose after time elapsed. These latter occurrences can be seen in the examples of straight sodium nitrite and straight sodium bicarbonate respectively.

TABLE II

| Example No. | 6 | | 7 | | |
|---|---|---|---|---|---|
| Components: | | | | | |
| Water | 16.5 | 16.5 | 16.9 | 16.9 | 16.9 |
| Ammonium Nitrate (prills) | 52.0 | 52.0 | 53.5 | 53.5 | 53.5 |
| Sodium Nitrate (coarse) | 15.6 | 15.6 | 16.1 | 16.1 | 16.1 |
| Aluminum Flakes | 8.5 | 8.5 | | | |
| Ethylene Glycol | 5.0 | 5.0 | 11.1 | 11.1 | 11.1 |
| Ground Coal | 1.2 | 1.2 | 1.2 | 1.2 | 1.2 |
| Natural Guar Gum | 1.2 | 1.2 | 1.2 | 1.2 | 1.2 |
| Cross-linking Agent | 0.03 | 0.03 | 0.03 | 0.2 | 0.2 |
| Sodium Nitrite | 0.09 | 0.045 | | 0.045 | 0.09 |
| Sodium Bicarbonate | | 0.045 | 0.09 | 0.045 | |
| Fumaric Acid | 0.1 | 0.065 | 0.16 | 0.20 | 0.03 |
| Initial Temp., ° F | 140 | 140 | 150 | 110 | 110 |
| Final pH | 3.3 | 4.4 | 3.6 | 3.0 | 4.5 |
| Sub-Summary Example 6 | | | | | |
| Maximum Specific Gravity | | 1.54 | | 1.54 | |
| Percent Sodium Nitrite | | 0.09 | | 0.045 | |
| Percent Sodium Bicarbonate | | | | 0.045 | |
| Specific Gravity After 2 Min | | 1.33 | | 1.29 | |
| Specific Gravity After 72 Hours | | 1.05 | | 1.23 | |
| Sub-Summary Example 7 | | | | | |
| Maximum Specific Gravity | 1.46 | 1.46 | | 1.46 | |
| Percent Sodium Nitrite | | 0.045 | | | 0.09 |
| Percent Sodium Bicarbonate | 0.09 | 0.045 | | | |
| Specific Gravity after— | | | | | |
| 3 Min | 1.35 | 1.36 | | | |
| 5 Min | | | | 1.40 | |
| 20 Hrs | 1.39 | 1.20 | | 1.21 | |
| 92 Hrs | 1.41 | 1.20 | | ¹(1.15) | |

¹ 44 hrs.

It is evident that there are several factors which will influence conditions for the most satisfactory operation of the invention. For example, the method of introduction of the reacting chemicals forming the aeration agent of this invention may be in the form of particulate dry solids, solutions or suspensions. These chemicals as a solution, suspension or dry may be added to the slurry as mixed, or a solution or suspension thereof may be injected into the gravity flow of the slurry after mixing, or a solution or suspension thereof may be injected into the pumped flow conduit of the slurry after mixing and pumping. In all these variations, the aerated product may be directly charged into packages where desired or directly pumped into a bore-hole.

Moreover, the present invention contemplates as the aeration agent the utilization of fast gas generating material of the group consisting of sodium bicarbonate, potassium bicarbonate, sodium carbonate, and potassium carbonate, and mixtures thereof and slow gas generating materials of the group consisting of sodium nitrite, potassium nitrite, calcium nitrite and barium nitrite and mixtures thereof in the ratio of about 1 to 4 to about 4 to 1 parts by weight of the aeration agent. Sodium bicarbonate and sodium nitrite in preparation by weight of about 2 to 1 to about 1 to 2 are generally used in substantially equal proportion and are preferred. The term "aeration agent" as used herein means an agent which causes the explosive composition to be combined with or charged with gas. The term "maximum specific gravity" as used herein means the specific gravity of the aqueous slurry explosive composition exclusive of gas.

It has been found that the aeration agent of the present invention may be incorporated into gelled aqueous slurry compositions in an amount of from about 0.01 to about 1.00% and preferably from about 0.02 to about 0.50% by weight of the slurry composition. Within the range of the aforementioned amounts are compositions having specific gravities lowered to between about 30 to 90% of maximum for those containing non-explosive ingredients and lowered to between about 30 and 95% of maximum for those containing explosive sensitizing agents. Furthermore, it will be appreciated that benefits from the invention inure when the aeration agent of the present invention is utilized with gelled aqueous slurry compositions containing explosive sensitizers, such as smokeless powder, TNT, RDX, PETN, HBX, and the like, as well as aqueous slurry compositions in which all ingredients per se are non-explosive. Additionally, it will be appreciated that benefits from the invention inure when the aeration agent of the present invention is ultilized with gelled aqueous slurry compositions containing non-explosive energizers other than aluminum and silicon or combined therewith, such as, calcium silicide, calcium boride, silicon carbide, ferrosilicon, magnesium alloy, and the like.

Suitable thickeners include cross-linkable materials, such as, carboxymethylcellulose and guar gum to form the gelled aqueous slurry explosive. Guar gum present in cross-linked form is preferred in conjunction with the present invention to impart a plastic but easily deformable consistency for retaining the dispersed gas ingredients over prolonged periods as packaged or placed into boreholes.

It will be seen, therefore, that this invention may be carried out by the use of various modification and changes without departing from its spirit and scope, with only such limitations placed thereon as are imposed by the appended claims.

What we claim and desire to protect by Letters Patent are:

1. An improved explosive composition comprising at least one fast gas generating material of the group consisting of sodium bicarbonate, potassium bicarbonate, sodium carbonate and potassium carbonate and at least one slow gas generating material of the group consisting of sodium nitrite, potassium nitrite, calcium nitrite and barium nitrite dispersed in a gelled aqueous slurry explosive composition of the inorganic oxidizer salt type in which said gas generating materials cause said composition to be charged with gas in an amount sufficient for adjusting and maintaining a predetermined specific gravity for said composition.

2. The composition according to claim 1 wherein the ratio of the fast generating material to the slow gas generating material is from about 1 to 4 to about 4 to 1 parts by weight.

3. The composition according to claim 1 wherein the ratio of the fast gas generating material to the slow gas generating material is from about 1 to 2 to about 2 to 1 parts by weight.

4. The composition according to claim 3 wherein the rapidly released gas of the fast gas generating material is substantially water soluble and the slowly released gas of the slow gas generating material is substantially water insoluble.

5. The composition according to claim 4 wherein the fast gas generating material is sodium bicarbonate and the slow gas generating material is sodium nitrite in substantially equal proportion by weight.

References Cited

UNITED STATES PATENTS 3,288,658 11/1966 Ferguson et al. _____ 149—2
3,288,661 11/1966 Swisstack _____ 149—42 X BENJAMIN R. PADGETT, *Primary Examiner.*

S. J. LECHERT, JR., *Assistant Examiner.*